(12) United States Patent
Bala et al.

(10) Patent No.: US 9,808,724 B2
(45) Date of Patent: Nov. 7, 2017

(54) MUSIC GAME SOFTWARE AND INPUT DEVICE UTILIZING A VIDEO PLAYER

(75) Inventors: Karthik Bala, Menands, NY (US); John Reine, Menands, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 12/886,306

(22) Filed: Sep. 20, 2010

(65) Prior Publication Data
US 2012/0071238 A1 Mar. 22, 2012

(51) Int. Cl.
| | |
|---|---|
| A63F 13/814 | (2014.01) |
| A63F 13/23 | (2014.01) |
| A63F 13/5375 | (2014.01) |
| A63F 13/95 | (2014.01) |
| A63F 13/54 | (2014.01) |
| G10H 1/00 | (2006.01) |
| G10H 1/34 | (2006.01) |
| G10H 1/36 | (2006.01) |

(52) U.S. Cl.
CPC ............ *A63F 13/814* (2014.09); *A63F 13/23* (2014.09); *A63F 13/5375* (2014.09); *A63F 13/54* (2014.09); *A63F 13/95* (2014.09); *G10H 1/0016* (2013.01); *G10H 1/342* (2013.01); *G10H 1/363* (2013.01); *G10H 1/368* (2013.01); *A63F 2300/202* (2013.01); *A63F 2300/203* (2013.01); *A63F 2300/8047* (2013.01); *G10H 2210/026* (2013.01); *G10H 2210/091* (2013.01); *G10H 2210/305* (2013.01); *G10H 2220/015* (2013.01); *G10H 2220/135* (2013.01); *G10H 2220/211* (2013.01); *G10H 2220/301* (2013.01); *G10H 2220/315* (2013.01); *G10H 2220/415* (2013.01); *G10H 2230/135* (2013.01); *G10H 2240/211* (2013.01); *G10H 2240/285* (2013.01); *G10H 2240/301* (2013.01); *G10H 2240/311* (2013.01); *G10H 2240/321* (2013.01)

(58) Field of Classification Search
CPC .................. G07F 13/814; G10H 2220/135
USPC ........................................... 463/31
See application file for complete search history.

(56) References Cited

U.S. PATENT DOCUMENTS

| | | | |
|---|---|---|---|
| 5,393,926 A | 2/1995 | Johnson | |
| 5,491,297 A | 2/1996 | Johnson et al. | |
| 5,723,802 A | 3/1998 | Johnson et al. | |
| 6,225,547 B1 | 5/2001 | Toyama et al. | |
| 7,625,284 B2 * | 12/2009 | Kay et al. | 463/31 |
| 7,758,427 B2 * | 7/2010 | Egozy | 463/42 |

(Continued)

OTHER PUBLICATIONS

"White Paper Blu-ray Disc Format 2.B Audio Visual Application Format Specifications for BD-ROM", pp. 1-35, Blu-ray Disc Association, Mar. 2005.

(Continued)

*Primary Examiner* — Jay Liddle
(74) *Attorney, Agent, or Firm* — Klein, O'Neill & Singh, LLP

(57) ABSTRACT

A video game includes an audio-video stream combined with game graphics and game sounds. The game graphics are overlaid on the video stream and updated in synchronization with the stream. Update of the game graphics and sounds depends on inputs received from a game player. The game player may provide input using a game controller coupled to the video game by an adapter. The video game may play on a Blu-ray player.

18 Claims, 7 Drawing Sheets

(56) References Cited

U.S. PATENT DOCUMENTS

| | | | |
|---|---|---|---|
| 8,003,872 B2* | 8/2011 | Lopiccolo et al. | 84/609 |
| 2005/0255914 A1* | 11/2005 | McHale et al. | 463/31 |
| 2005/0288099 A1* | 12/2005 | Shimizu et al. | 463/37 |
| 2006/0058101 A1* | 3/2006 | Rigopulos | 463/35 |
| 2007/0232374 A1 | 10/2007 | Lopiccolo et al. | |
| 2009/0017908 A1* | 1/2009 | Miyamoto | 463/31 |
| 2009/0104956 A1* | 4/2009 | Kay et al. | 463/7 |
| 2009/0170598 A1 | 7/2009 | Oberg et al. | |
| 2009/0291756 A1* | 11/2009 | McCauley et al. | 463/31 |
| 2009/0305782 A1 | 12/2009 | Oberg et al. | |
| 2010/0009750 A1* | 1/2010 | Egozy et al. | 463/35 |
| 2010/0041477 A1* | 2/2010 | Kay et al. | 463/31 |
| 2010/0087240 A1* | 4/2010 | Egozy et al. | 463/7 |
| 2010/0255903 A1 | 10/2010 | Bala | |
| 2010/0304811 A1* | 12/2010 | Schmidt et al. | 463/7 |
| 2012/0169837 A1* | 7/2012 | Olofsson | H04N 7/147 |
| | | | 348/14.12 |

OTHER PUBLICATIONS

"Application Definition Blu-ray Disc Format BD-J Baseline Application and Logical Model Definition for BD-ROM", pp. 1-45, Blu-ray Disc Association, Mar. 2005.

Bruce Hopkins, "Blu-ray Disc Application Development with Java ME, Part 1: Creating Your First Application", Feb. 17, 2010, http://java.sun.com/developer/technicalArticles/javame/bluray/.

* cited by examiner

MUSIC GAME SOFTWARE AND INPUT DEVICE UTILIZING A VIDEO PLAYER

BACKGROUND OF THE INVENTION

The present invention generally relates to video games and, more particularly, to a video game and a peripheral for a video game played on a movie player.

Video games provide fun and enjoyment for many. Video games allow game players to participate in a variety of simulated activities, including those that the game players may not be able or desire to experience directly. Video games receive interactive inputs from users and may produce vibrant visual displays with accompanying audio.

Video games are often provided by way of a dedicated electronic game device. Such devices may include a variety of special capabilities, for example capabilities related to processing speed, increased graphics capabilities, or other specialized functions. Some game players may not play video games requiring some or all of these special capabilities, and may not wish to bear the costs of paying for such capabilities. In addition, such dedicated electronic game devices may require connection to other devices such as televisions, which themselves may also be connected to a host of still other devices, resulting in increased clutter.

BRIEF SUMMARY OF THE INVENTION

In various aspects the invention provides a method performed by a movie player including a video disc reader, a media decoder for decoding audio-video data from the video disc reader, and a processor configured by program instructions, the method comprising: commanding playback of a video clip comprised of a sequence of video frames as part of providing presentations of a video game, the playback of the video clip including decoding of video data stored on a local removable optical media to provide decoded video signals; commanding display of game graphics as part of providing presentations of the video game in conjunction with playback of the video clip, with display location of game graphics coordinated with respect to display location of video imagery of the video frames; and commanding display of revised game graphics as part of providing presentations of the video game based on input received from a controller data-coupled to the movie player.

Another aspect of the invention provides a system for video game play configured by program instructions, the device comprising: an optical disc reader for reading data from an optical disc, the data including audio and video data; a media decoder coupled to the optical disc reader and configured to decode the audio-video data to produce decoded audio and video signals; a processor coupled to the optical disc reader and configured by program instructions to command presentation of game graphics and additional game sounds, at least some of the game graphics or additional game sounds in response to actions by a game player; and a game controller coupled to the processor and configured to receive actions from the game player and supply corresponding signals to the processor.

Another aspect of the invention provides a non-transitory computer-readable medium containing program instructions, the program instructions comprising: instructions that command playback of a video clip comprised of a sequence of video frames as part of providing presentations of a video game, the playback of the video clip including decoding of video data to provide decoded video signals; instructions that command display of game graphics for the video game in display locations that do not substantially degrade viewing of video frames of the video clip; and instructions that command display of revised game graphics based on input received from a controller.

These and other aspects of the invention are more fully comprehended upon review of this disclosure.

DETAILED DESCRIPTION

Figure 1:
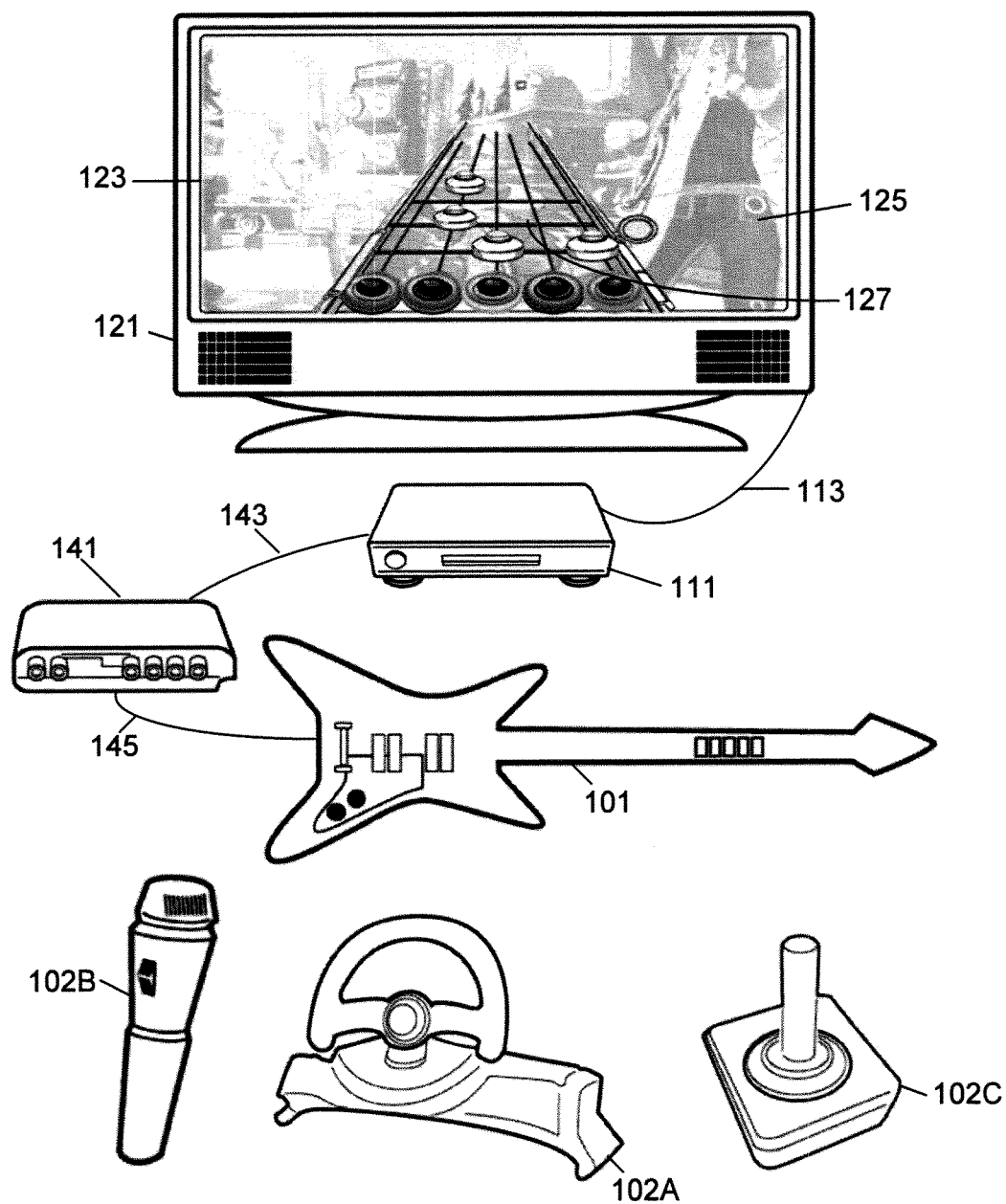
FIG. 1 is an example of a video game system in accordance with aspects of the invention.

FIG. 1 illustrates an example of a video game system in accordance with aspects of the invention. The video game system includes a movie player 111. The movie player includes circuitry for reading audio and video data from a local memory, for example an optical disk, and for processing the audio and video data for presentation, for example for provision of audio and video signals to a display device 121, which may include audio capabilities. In some embodiments, the movie player may be a Blu-ray player, capable for example of playing a BLU-RAY DISC®. The display device is generally coupled to the movie player by an audio-video cable 113. The display device may also be coupled to the movie player wirelessly. Wireless coupling may use a wireless adapter at the display device, the movie player, or both. In some embodiments, the movie player is integrated with a device having a built-in display and built-in speakers.

The movie player also includes circuitry, generally in the form of one or more processors or processing cores, for executing program instructions providing for video game play including, in many embodiments, selection of audio and video data from the local memory. Generally video game play may be provided by presenting a game player, or user, displays to which the user responds, and modifying the displays in response to user inputs, thereby providing an interactive user experience. In some embodiments, the video games may be music-based video games, for example, in which a game player attempts to operate a simulated musical instrument or move about (as indicated by an electronic pad, accelerometer, or imaging device) in response to displayed instructive cues. In other embodiments, the video game may be a sport related game, for example a driving game, or other type of game.

The program instructions for providing video game play include, variously in different embodiments, program instructions for processing inputs from a controller 101 and determining game states, selection of audio and video data for presentation, generating graphic overlay information, which may be considered game graphics, and, in some embodiments, additional audio information. The game graphics and the additional audio information may depend on currently selected audio and video data, as well as game states.

For example, the processor, as configured by program instructions, may cause display of a music track overlaid on a music video for a music game or display of an automotive dashboard or lanes of a road overlaid on a road scene for a driving game, with display of the music video or road scene being based on the video data read from the local memory. In many embodiments the video data includes data for use in displaying video frames. In some embodiments video imagery is not present in portions of the video frames, or, if present, is unimportant to content of the video frames such that an inability to view those portions does not substantially degrade a typical user's viewing enjoyment of the video frames. For example, video frames may depict scenes including foreground and background, with the background either unnecessary or not fully necessary for a user's understanding or viewing enjoyment of a video scene. Similarly, video frames may depict scenes formed of rendered graphics, and the video frames may include portions devoid of imagery provided by the rendered graphics. In such embodiments the processor may command display of game graphics, for example note tracks, in display locations which would otherwise display background video images or be devoid of imagery. Such display locations for game graphics may be identified, for example, based on prior knowledge of display information of the video frames or of the rendered graphics.

The processor generally generates game graphics information and/or game sounds information responsive to inputs from the controller, with generation of the game graphics and/or game sounds synchronized to playback or commanded playback of the audio and video data, in many embodiments. The game graphics information and game sound information are combined, by circuitry of the movie player, in the audio and video display signals for common presentation on the display. In some embodiments, of course, the circuitry for reading audio and video data from the local memory and for processing the audio and video data may be included, at least in part, in the processor.

The movie player therefore includes circuitry for receiving inputs from the controller 101, which may be manipulated by a game player. The circuitry in various embodiments may be circuitry of an Ethernet port, a USB port, wireless receiver or transceiver circuitry, or other circuitry. The controller includes one or more input devices for the game player to signal game actions. Example input devices include buttons, switches, accelerometers, position sensors, and microphones. In some embodiments, and as shown in FIG. 1, the controller has a guitar shape and may include, for example, a strum bar and fret buttons as user input devices. In other embodiments, controllers may include a steering wheel 102A, a microphone 102B, or a joystick 102C as user input devices or various embodiments may include other controllers commonly used in video game play. In some embodiments the controller may be in communication with the wireless receiver of the movie player using BLUETOOTH® compliant communications or other communication formats. In addition, in some embodiments the controller may be in communication with the wireless receiver of the movie player by way of infrared communications, and the controller may include infrared transmission capabilities, and in some embodiments the controller may be, for example, a cellular telephone, for example one with expanded data capabilities, a personal digital assistant or other portable consumer electronic devices with infrared transmission capabilities.

The movie player is coupled to the controller by way of an adapter 141. The adapter is coupled to the controller by a controller link 145 and to the movie player by an adapter link 143. In some embodiments, the controller link is a universal serial bus (USB) cable and the controller and the adapter include USB interfaces. In some embodiments, the controller, provides musical instrument digital interface (MIDI) compliant signals to the adapter, which may also provide MIDI compliant signals to the movie player. In some embodiments the adapter may translate non-MIDI compliant signals from the controller to MIDI compliant signals to be sent to the movie player, and in some embodiments the adapter may translate MIDI compliant signals from the controller to some other signal format for signals to be sent to the movie player. In some embodiments, the adapter link is an Ethernet cable and the adapter and the movie player include Ethernet interfaces. Either or both of the controller link and the adapter link may use a wireless connection. For example, FIG. 1 illustrates the controllers with the steering wheel, the microphone, and the joystick with wireless connections. In some embodiments, multiple controllers are coupled to the adapter. Each controller may be used, for example, by a different one of multiple game players.

In many embodiments, as illustrated in FIG. 1, the display device is a television that provides both visual and sound reproduction. In other embodiments, the audio and video signals are reproduced by separate devices. A display screen 123 of the display device displays video images of game play, generally as commanded by the processor or other circuitry of the movie player. In the embodiment of FIG. 1, the display screen shows a screen shot of video game play with combined display of a video imagery 125, for example of a music video, overlaid by a music track 127 with portions highlighted according to actions by the game player. In another embodiment, the display screen of a driving game may include a road scene overlaid by an automotive dashboard graphic.

Figure 2:
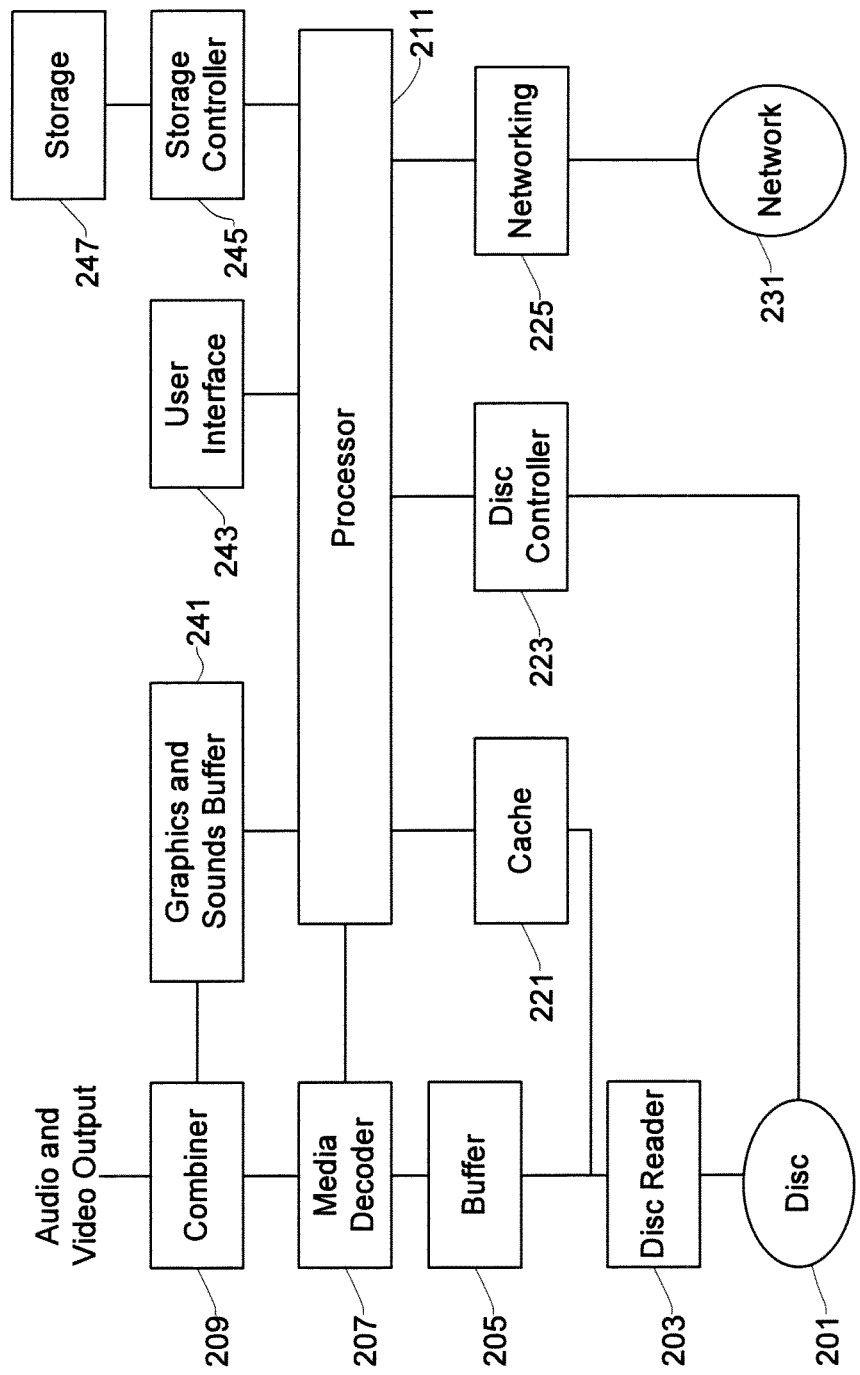
FIG. 2 is a block diagram of a movie player in accordance with aspects of the invention.

FIG. 2 is a block diagram of an embodiment of a movie player in accordance with aspects of the invention, although in various embodiments different movie players may include additional or fewer features, or may be implemented in different manners. A processor 211 generally uses program instructions to control game play in the movie player. The processor controls a video disc 201 using a disc controller 223. Data, including program instructions and audio and video data, are read from the video disc using a disc reader 203. Program instructions that are read from the video disc are stored in an application cache 221 for use by the processor. The program instructions, in some embodiments, may include instructions to read a model identifier or other indications of capabilities of the movie player with other instructions including different sequences of instructions for the processor to perform based on the capabilities of the movie player. Audio and video data that are read from the video disc are temporarily stored in a buffer 205. The buffer passes the audio and video data to a media decoder 207 as audio and video streams. Decoded audio and video signals from the media decoder are supplied for viewing and listening by way of a combiner 209. Audio and video signals output from the combiner may be coupled to a television or other devices for conversion to visual and sound form. In some embodiments, the video disc stores the audio and video data in a compressed form and the movie player decompresses the audio and video data to supply the decoded audio and video signals.

For game play, the processor produces game graphics and game sounds to be combined with the decoded audio and video signals from the media decoder. The processor may algorithmically generate or render the game graphics and game sounds. The game graphics are generally generated as two-dimensional graphics. The processor may also use stored audio segments or images in generating the game graphics and game sounds. The stored audio segments and images may be read from the video disc along with the program instructions. The game graphics and game sounds are stored in a graphics and sounds buffer 241 before being supplied to the combiner 209. In some embodiments, the graphics and sounds buffer includes a palette or color look up table. The game graphics may be considered an overlay relative to the decoded video signal from the media decoder. In some embodiments, the game graphics include an alpha channel that the combiner uses to alpha blend the decoded video signal and the game graphics. In other embodiments, the game graphics and the decoded video signal are combined using chroma keying.

The movie player includes a user interface 243 for receiving user inputs, such as from a wireless transceiver or transmitter, which may be a BLUETOOTH® compliant transmitter or an infrared remote control or, in some embodiments, from other handheld consumer electronic devices such as cellular telephones, portable music players, or other such devices with BLUETOOTH® or infrared transmission capabilities. In some embodiments the processor may receive inputs through the user interface from a controller signaling actions of a game player, and in some embodiments the controller may be a controller as discussed with respect to FIG. 1, or a remote control, cellular telephone, portable music player, or other device. The processor is also coupled to a storage device 247 by a storage controller 245. In some embodiments, the storage device is a hard disk drive. The storage device may be used, for example, to store game information related to users of the movie player. In some embodiments, at least some of the program instructions and audio and video data are stored on the storage device.

In some embodiments the processor is also coupled to a networking module 225 to provide communication over a network interface 231. The networking module generally conforms to a standard, for example, Ethernet, with the interface providing a corresponding connection, for example, RJ45. The networking module allows the processor to communicate with other devices having compatible communication mechanisms. The processor may receive inputs over the network interface from a controller signaling actions of a game player, either instead of or in addition to receiving such inputs through the user interface 243. Additionally, the networking module may be used to download or upload game information, for example, from an Internet site or from a computer over a local network.

The audio and video data stored in the movie player may include data representing recorded audio-video information, for example, a movie or a music video. In another example, the audio and video data may include previously rendered graphics, for example of a three-dimensional scene which may simply be termed three-dimensional graphics. In some embodiments, the audio and video data are stored as a number of clips of encoded audio and video information, for example, formatted as MPEG-2 transport streams. Some clips may include multiple audio or video components, for example, different viewing positions in a three-dimensional world, different angles, different audio sounds, or different languages. The video of each clip commonly includes a sequence of frames.

The processor controls operation of the media decoder to determine what decoded audio and video signals it produces. In addition to determining what data from the video disc are supplied to the media decoder, the processor may control the playback speed of the media decoder and may select which of multiple channels that may be in the data from the video disc are output from the media decoder. In some embodiments, the processor may instruct multiple channels to be output simultaneously, for example, by mixing decoded audio signals with different volume levels or combining decoded video signals in a picture-in-picture manner. In some embodiments, the processor's control of the media decoder is based on game play. More particularly, the determination of what data is to be supplied to the media decoder for playback and characteristics of the playback such as speed, outputs, and volume may vary based on the actions of the game player. Additionally, the processor coordinates its commanding of game graphics and game sounds with, in various embodiments, determination of data to be supplied to the media decoder or timing of data supplied to the media decoder.

The clips of encoded audio and video information, in some embodiments, are decoded by the media player in segments from a beginning time to an ending time identified by time stamps identifying time points within the clip. Multiple segments may be decoded in sequence according to a list of segments. The list of segments may be termed a PlayList where the PlayList has one or more clip identifiers, beginning times, and ending times termed PlayItems. In various embodiments, game play may include playback of audio and video data in units of PlayLists, PlayItems, or arbitrary segments. Accordingly, the processor may control how the media decoder produces decoded audio and video signals by commanding decoding of a specified PlayList, decoding of a specified PlayItem selected from a PlayList, or decoding of a specified clip from a specified beginning time to a specified ending time.

Figure 3:
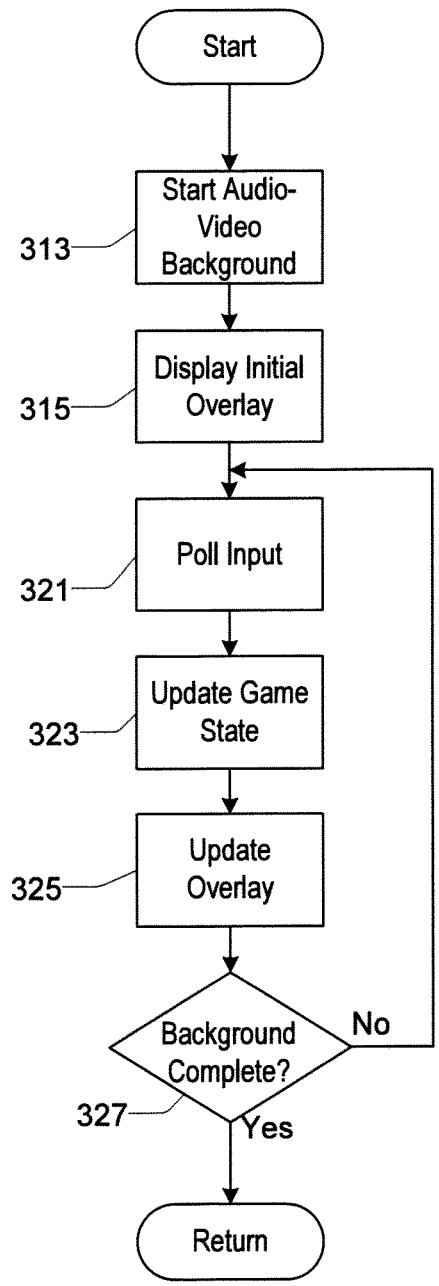
FIG. 3 is a flowchart of a process for a video game in accordance with aspects of the invention.

FIG. 3 is a flowchart of a process for a video game in accordance with aspects of the invention. In some embodiments, the process is performed by a movie player executing program instructions, for example, the movie player of FIG. 2. In some embodiments, the movie player is a Blu-ray player and the program instructions are stored on an optical disc or another computer-readable medium. The process may begin when a game player inserts an optical disc into the movie player or when the game player selects a game to begin from a menu.

In block 313, the process begins playing back, or streaming, an audio-video background for display and sound reproduction. What audio-video background the process plays back may vary, for example, depending on the game player's menu selection, preferences of the game player, or past performances by the game player. In an embodiment for a music game, the audio-video background may be a music video to which the game player will perform. In embodiments of the process performed by a movie player, the data for the audio-video background is generally stored local to the movie player. In some embodiments, the data for the audio-video background is stored in a compressed form and playing back the audio-video background includes decompressing the data. The process additionally establishes an initial game state including, for example, a score, a difficulty level, and other game player status.

In block 315, the process displays an initial overlay on the audio-video background. The overlay includes game graphics with information about the video game such as a score and prompts for actions by the game player. For example, in a driving game, the overlay may include arrows prompting the game player to perform corresponding steering, accelerating, or braking actions. The process may also produce game sounds to accompany the game graphics. In some embodiments, the process is for a video game having multiple game players and some game sounds and game graphics may be associated with certain game players.

In block 321, the process polls for input from the game player. Input from the game player may be received from a controller by way of an adapter as illustrated in FIG. 1. In various embodiments the controller may be, for example, a standard game controller, a simulated musical instrument or other simulated device, a controller with an accelerometer or other motion or position sensitive device, or an imaging or position sensor which detects or can be used to detect game player position or motion. Inputs from the game player are commonly signaled electrically, although the type of physical action taken by the game player varies with the particular type of game. For example, in a karaoke game, the game player may provide inputs to the process by singing. In some embodiments, the process may use a digital signal processing device to transform signals reflecting game player inputs, for example, by pitch detection or correction, before the signals are received by a processor performing parts of the process.

In block 323, the process updates the game state based on the input received in block 321. How a received input alters the game state will generally depend on the current game state and timing of the input. In particular, updating the game state is synchronized to progression of the audio-video background. The process may additionally alter playback of the audio-video background based on the input received in block 321. For example, the process may individually alter the volumes of multiple audio channels included in the audio-video background.

In block 325, the process displays an updated overlay, including any associated game sounds, based on the updated game state from block 323. The updated overlay may include, for example, prompts for new actions for the game player to perform, an indication of whether the game player performed prior actions correctly, and a current game score. In some embodiments, correctness of performance by the game player is indicated by color changes in the displayed overlay. In other embodiments, the process indicates correctness of performance by the game player using game sounds. The process times displaying of the updated overlay to be synchronized with the audio-video background. For example, a processor controlling a movie player may wait for playback of the audio-video background to reach a certain time stamp before commanding display of the updated overlay. In another example, the updated overlay may include a time stamp indicating at what time in the audio-video background the new overlay is to be displayed. In some embodiments, the process creates a set or sequence of updated overlays. Each updated overlay in the sequence may be displayed, for example, overlaid on sequential frames of the video background.

In block 327, the process checks if the audio-video background has completed. Completion may be based, for example, on reaching an ending time stamp value. If the audio-video background has completed, the process returns; otherwise, the process returns to block 321.

Figure 4:
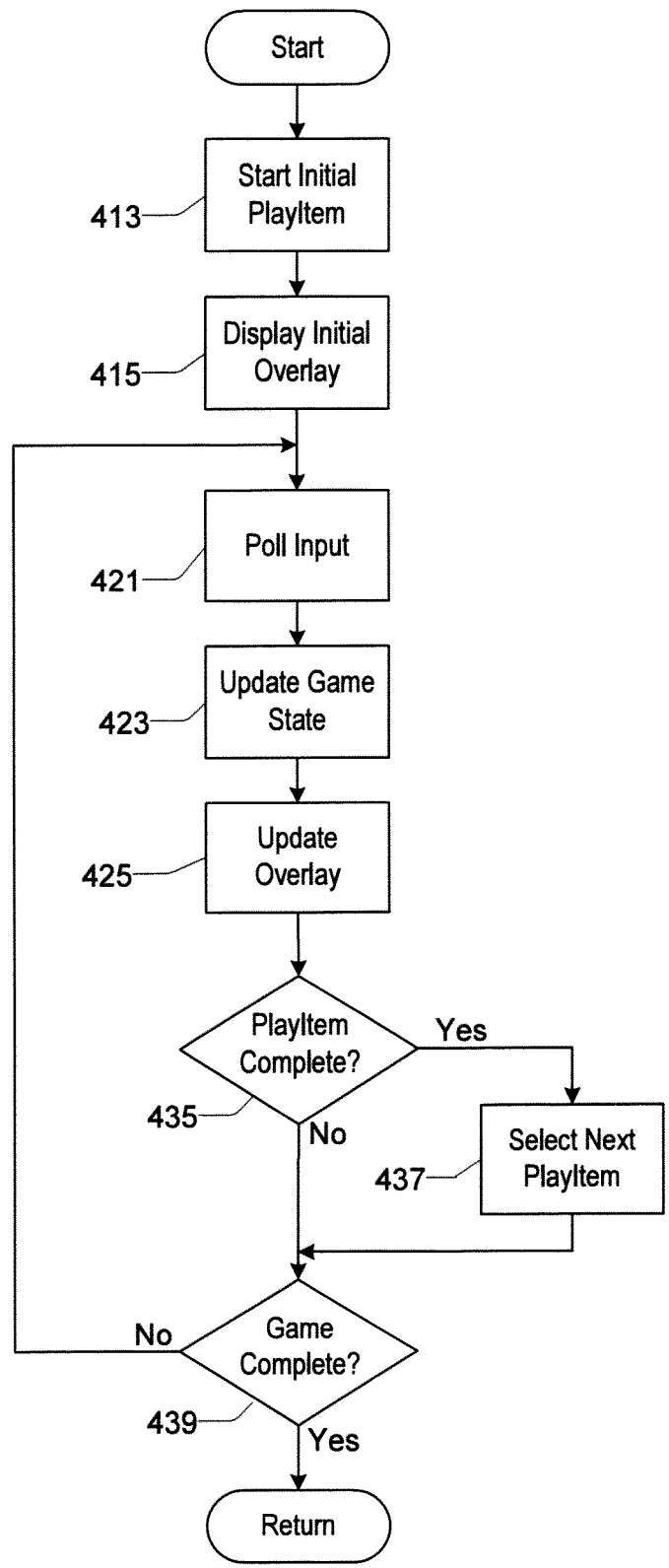
FIG. 4 is flowchart of another process for a video game in accordance with aspects of the invention.

FIG. 4 is a flowchart of another process for a video game in accordance with aspects of the invention. In some embodiments, the process is performed by a movie player executing program instructions, for example, the movie player of FIG. 2. In some embodiments, the movie player is a Blu-ray player and the program instructions are stored on an optical disc or another computer-readable medium. The process may begin when a game player inserts an optical disc into the movie player or selects a game to begin from a menu.

In block 413, the process begins playing back, or streaming, an initial audio-video segment, termed a PlayItem and having a duration indicated by beginning and ending time stamps, to provide an audio-video background for display and sound reproduction. What initial audio-video segment the process streams may vary, for example, depending on the game player's menu selection, preferences of the game player, or past performances by the game player. In a music game, the audio-video background may be, for example, a music video to which the game player will perform. The process additionally establishes an initial game state including, for example, a score, a difficulty level, and other game player status.

In block 415, the process displays an initial overlay on the audio-video background. The overlay may include such information as a score and prompts for game player actions. For example, in a music game, the overlay may include a music track prompting the game player to perform corresponding actions on a controller. The overlay may be termed game graphics. The process may produce game sounds to accompany the game graphics.

In block 421, the process polls for input from the controller. Input from the game player may be received from the controller by way of an adapter as illustrated in FIG. 1. The input received may indicate, for example, button presses on the controller, movements of the controller, or, in some cases, no action by the game player. Inputs from the game player are commonly signaled electrically although the type of physical action taken by the game player varies with the particular type of game.

In block 423, the process updates the game state based on the input received in block 421. How a received input alters the game state will generally depend on the current games state and timing of the input. In particular, updating the game state may depend on progression of playback of the PlayItem. For example, in a music game, the process times prompts for the game player to perform a note to match corresponding audio in the PlayItem. In some embodiments, the process may alter streaming of the PlayItem based on inputs from the game player. For example, volumes of audio channels may be raised or lowered.

In block 425, the process displays an updated overlay, including any accompanying game sounds, based on the updated game state from block 423. The updated overlay may include, for example, new prompts for actions by the game player, an indication of whether the game player performed prior actions correctly, and a current game score. In some embodiments, correct performance is indicated by highlighting portions of the displayed overlay. The process times displaying of the updated overlay to be coordinated with progression of the PlayItem. In some embodiments, the process uses a time stamp to indicate at what time in the PlayItem the updated overlay is to be displayed. Additionally, the process creates a set or sequence of updated overlays in some embodiments. Each updated overlay in the sequence may be displayed, for example, overlaid on corresponding sequential video from the PlayItem.

In block 435, the process checks if streaming of the PlayItem has completed. Completion may be based, for example, on reaching the ending time stamp of the PlayItem. If the PlayItem has completed, the process continues to block 437; otherwise, the process continues to block 439. In some embodiments, the process determines completion in advance of the final portions of the PlayItem being reproduced to allow for delays in subsequent process actions.

In block 437, the process selects a next PlayItem to be streamed. The selection may be based on how well the game player has performed prior portions of the game. For example, if the game player has performed relatively well, a faster paced next PlayItem may be selected and if the game player has performed relatively poorly, a slower paced next PlayItem may be selected. The process thereafter continues to block 439.

In block 439, the process checks if the game has completed. Completion may be based, for example, on elapsed time since the game started, completion of a final PlayItem, or completion of a sequence of actions by the game player. If the game has completed, the process returns; otherwise, the process returns to block 421. The process may save information about the game, for example, the game player's score and performance level, before returning.

Figure 5:
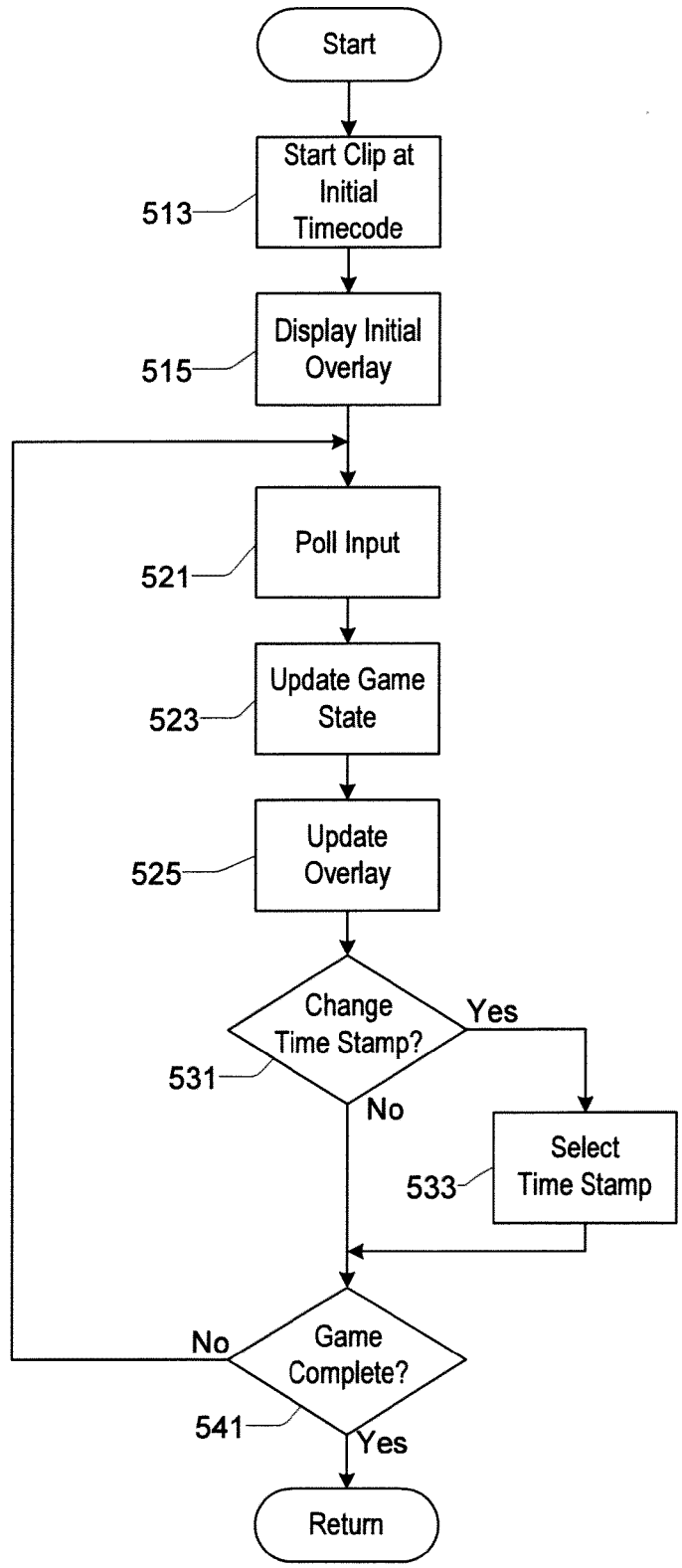
FIG. 5 is flowchart of other process for a video game in accordance with aspects of the invention.

FIG. 5 is a flowchart of another process for a video game in accordance with aspects of the invention. In some embodiments, the process is performed by a movie player executing program instructions, for example, the movie player of FIG. 2. In some embodiments, the movie player is a Blu-ray player and the program instructions are stored on an optical disc or another computer-readable medium. The process may begin when a game player inserts an optical disc into the movie player or selects a game to begin from a menu.

In block 513, the process begins playing back an audio-video clip to provide an audio-video background for display and sound reproduction. The audio-video clip includes time stamps that indicate elapsed times within the clip. The process begins streaming the clip at an initial time stamp. The audio-video clip that the process begins playing back and the initial time stamp may vary, for example, depending on the game player's menu selection, preferences of the game player, or past performances by the game player. The process additionally establishes an initial game state including, for example, a score, a difficulty level, and other game player status.

In block 515, the process displays an initial overlay, or game graphics, on the audio-video background. The overlay may include such information as a score, prompts for game player actions, and indicators of other game status. The process may additionally produce game sounds accompanying the overlay. In some embodiments, the process is for a video game having multiple game players and some game sounds and game graphics may be associated with particular game players.

In block 521, the process polls for input from the game player. Input from the game player may be received from a controller by way of an adapter as illustrated in FIG. 1. In some embodiments, the process receives inputs from the game player using an interrupt mechanism initiated by the controller.

In block 523, the process updates the game state based on the input received in block 521. How a received input alters the game state will generally depend on the current games state and the timing of the input. In particular, updating the game state depends on progression of playing back the audio-video background.

In block 525, the process displays an updated overlay, including accompanying game sounds, based on the updated game state from block 523. The updated overlay may include, for example, new prompts for actions by the game player, indications of the correctness of prior game player actions, and a current game score. In some embodiments, the updated overlay may indicate correct performance by the game player by highlighting items in the displayed overlay or by producing game sounds. The process times displaying of the updated overlay to be synchronized with progression of the audio-video background. For example, the updated game state may include a time stamp indicating at what time in the audio-video clip the new overlay is to be displayed.

In block 531, the process checks if playback of the audio-video clip should be changed to a new time stamp. The process may determine that it should change to a new time stamp based on the updated game state. If the time stamp should be changed, the process continues to block 533; otherwise, the process continues to block 541.

In block 533, the process selects a new time stamp in the audio-video clip from which to stream the audio-video background. The selection is generally based on the game state. For example, in a driving game, the game player's actions may lead to the game state transitioning to a crash, and the process would select the new time stamp to stream an appropriate crash sequence. In another example, if the game state indicates that the game player should be given increased challenges, the process may select the time stamp of sequence that has a relatively fast pace. In some embodiments, the process may be constrained in selecting the new time stamp. For example, the audio-video clip may have a limited number of time stamps that streaming can begin from. Additionally, the process may limit selection of time stamps to those that provide continuity with the preceding content of the clip. For example, the audio-video clip in a music game may include portions with the same audio content but different video content, and the process may select the new time stamp so that the audio content is reproduced unbroken. In some embodiments, the process may select a new time stamp in advance of when the corresponding audio and video will be reproduced, for example, to allow for processing delays such as reading the corresponding information from an optical disc.

In block 541, the process checks if the game has completed. Completion may be based, for example, on the elapsed time since the game started or completion of a sequence of actions by the game player. If the game has completed, the process returns; otherwise, the process returns to block 521.

Figure 6:
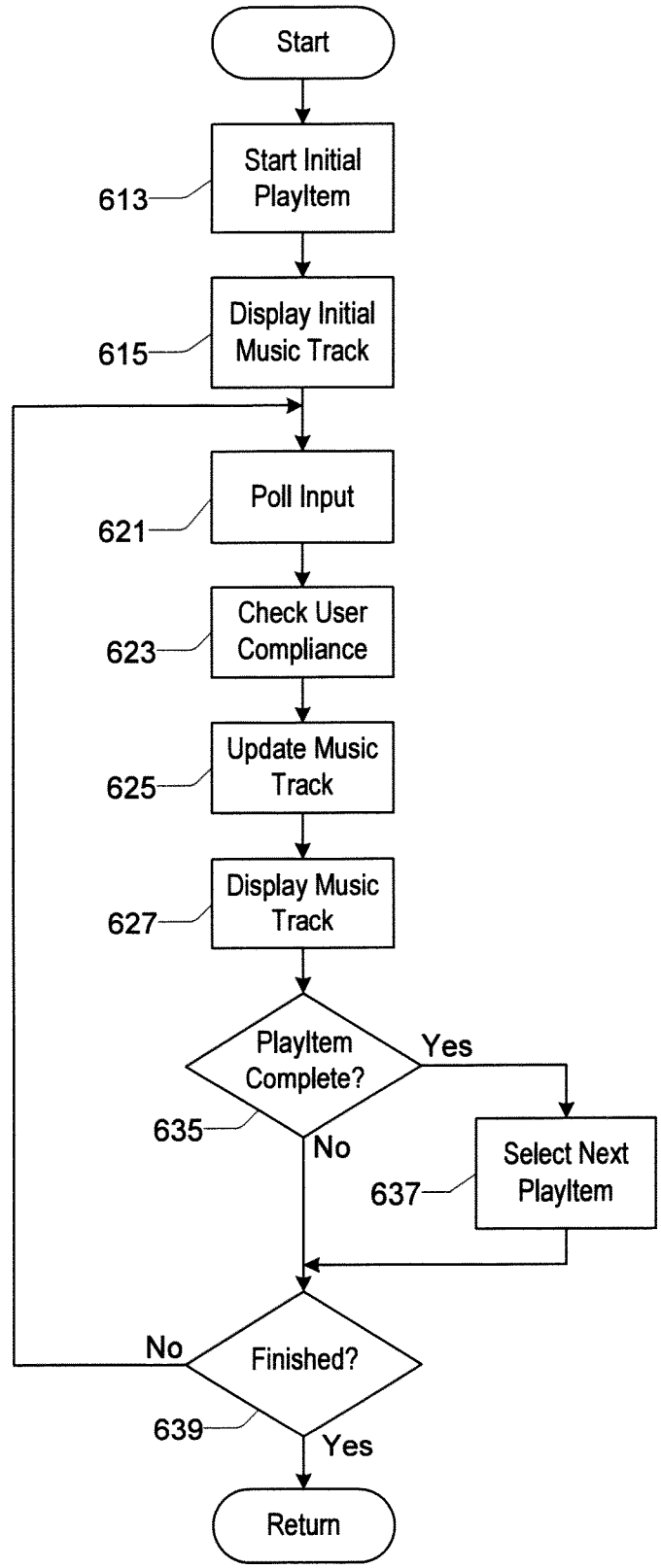
FIG. 6 is flowchart of a process for music-based video game in accordance with aspects of the invention.

FIG. 6 is a flowchart of a process for a music-based video game in accordance with aspects of the invention. In some embodiments, the process is performed by a movie player executing program instructions, for example, the movie player of FIG. 2. Program instructions for the process may be stored on an optical disc or another computer-readable medium. The music-based video game overlays a music track on a music video. The music video includes a sequence of audio and video segments that are played back to provide an audio-video background for display and sound reproduction. In some embodiments, each of the audio and video segments is one song. The process modifies the music track as the music video progresses. The process additionally controls the sequence of audio and video segments. The process may also alter playback of the audio-video background, for example, by changing volumes of audio channels included in the audio-video background.

The music track includes gems to provide a user with instructions of actions to perform on a controller, for example, a guitar controller. Expected user actions may be based on colors and positions of the gems. In one embodiment, the gems initially appear in an upper portion of a display screen and move generally toward a lower portion of the display screen. A horizontal NOW bar is displayed in the lower portion of the display screen with many user actions instructed to be performed when gems reach the NOW bar. The process also produces game sounds to accompany the music track. The process may select or alter the audio-video background and the music track, for example, depending on the user's selections, stored preferences of the user, or past performances by the user.

In block 613, the process begins playing back an initial segment of the music video, termed an initial PlayItem and having a duration indicated by beginning and ending time stamps. The PlayItem may be a portion of a music concert and may include a musician whose role the user will perform. The process additionally establishes an initial game state including, for example, a score, a difficulty level, type of controller, and other user status. In some embodiments, the process is for a music-based video game having multiple users, and the game state includes information for each of the users.

In block 615, the process displays an initial music track on the audio-video background. The initial music track may be displayed at the beginning time point of the initial PlayItem that it is overlaid on. In addition to the gems and NOW line described above, the process may display a score indicator, a power meter, and other indications of game status. In many embodiments, the music track is alpha blended with the underlying music video. Accordingly, the music track includes an alpha channel indicating the relative display intensities of the music track and the music video. More particularly, the process may combine the music track and audio-video background by adding values of pixels in the music track scaled by an alpha parameter to values of pixels in the audio-video background scaled by one minus alpha.

In block 621, the process polls for input from the user. Input from the user may be received from the controller by way of an adapter as illustrated in FIG. 1. Inputs from the user are commonly signaled electrically although the type of physical action taken by the user varies with the particular type of game. For example, the user may provide inputs by performing a strumming action on a guitar controller.

In block 623, the process checks for user compliance with the instructions contained in the music track. For example, when certain gems or combinations of gems reach the NOW bar, a corresponding user manipulation of the controller is considered correct. Often, user compliance is based on the specific user manipulation of the controller and the timing of the user's actions.

In block 625, the process updates the game state based on the user compliance from block 623. An updated music track is generated based on the updated game state. The updated music track may indicate the user's compliance, for example, by changing gem colors or transparency. Additionally or alternatively, the process may use game sounds to signal the degree of compliance. The process may also change the score indicator based on the degree of compliance. In some embodiments, updating the music track includes scrolling the position of the prior music track relative to the underlying music video. The updated music track may also include added gems instructing the user on future actions to perform on the controller. The new gems correspond to upcoming notes in the music video. In some embodiments, any user action may be considered correct. In these "free play" embodiments, the music track is updated to indicate the user's actions, for example, by showing musical notes corresponding to the user's manipulation of the controller.

In block 627, the process displays an updated music track using the update performed in block 625. The process times displaying of the updated music track to be synchronized with progression of the PlayItem. For example, the updated music track may be associated with a time stamp indicating at what time in the PlayItem the new overlay is to be displayed. In some embodiments, the process may create a set or sequence of updated music tracks, for example, with gems having relatively scrolled positions. Each updated music tracks may be displayed in a sequence overlaid on a sequence of video from the PlayItem. The process may alter playback of the PlayItem based on the game state. In some embodiments, the PlayItem includes multiple audio channels with the volume of a channel associated with the user lowered when the user performs poorly and raised when the user performs well. More particularly, in a guitar-based game, the process may raise or lower the volume of an audio channel containing a guitar track. In a multiple user game embodiment, the audio produced may be panned, for example, by changing a left-right balance control, based on relative performance of the users.

In block 635, the process checks if the PlayItem has completed. Completion may be based, for example, on the PlayItem reaching its ending time stamp value. If the PlayItem has completed, the process continues to block 637; otherwise, the process continues to block 639. In some embodiments, the process determines completion of the PlayItem in advance of the final portions of the item being reproduced to allow for delays in subsequent process actions.

In block 637, the process selects a next PlayItem to be streamed. The selection may be based on how well the user has performed prior portions of the game. For example, if the game player has performed relatively well, a PlayItem with an enthusiastic audience may be selected and if the game player has performed relatively poorly, a PlayItem with a less enthusiastic audience may be selected. Both selections of PlayItems may contain the same audio stream. Additionally, the next PlayItem is generally selected to have continuity with the preceding PlayItem and particularly to avoid an audible transition. In a multiple user embodiment, the process may select the next PlayItem based on the relative performance of the users, for example, to stream audio and video with features emphasizing the better performing user. In some embodiments, for example, when the PlayItem contains one song, selection of the net PlayItem may be made from a pre-established play list of songs. The process thereafter continues to block 639.

In block 639, the process checks if the game has finished. Finishing may be based, for example, on the elapsed time since the game started, on a final PlayItem reaching its ending time stamp, or a user input. If the game has finished, the process returns; otherwise, the process returns to block 621. The process may save information about the game, for example, the user's score and performance level, before returning.

Figure 7:
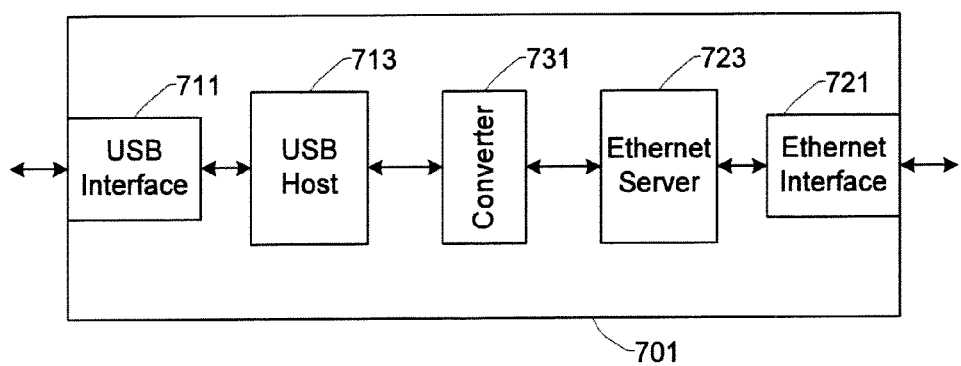
FIG. 7 is a block diagram of a game controller adapter in accordance with aspects of the invention.

FIG. 7 is a block diagram of a game controller adapter 701 in accordance with aspects of the invention. The game controller adapter may be the adapter of the video game system of FIG. 1. The game controller adapter adapts signals received on a USB interface 711 for transmission on an Ethernet interface 721 and signals received on the Ethernet interface for transmission on the USB interface. The USB interface may be coupled to a game controller, for example, a guitar-shaper controller. Signals from the game controller are coupled to a USB host 713. The USB host communicates with the controller according to a USB protocol and supplies data to a converter 731. In some embodiments, the game controller adapter includes additional interfaces. For example, additional USB interfaces may be used to connect to multiple game controllers, or an additional Ethernet interface may be used to provide a connection to the Internet.

The Ethernet interface may be coupled to a movie player. Signals from the movie player are coupled to an Ethernet server 723. The Ethernet server communicates with the movie player according to an Ethernet protocol and supplies data to the converter 731.

The converter modifies the data received from the USB host for transmission to by the Ethernet server. The modification may include, for example, adapting protocol negotiation and synchronization and buffering data to match differing communication rates of the USB and Ethernet protocols. An embodiment of the converter may compress data received from the USB host before supplying the data to the Ethernet server.

Although the invention has been described with respect to certain specific embodiments, it should be recognized that the invention comprises the novel and unobvious claims supported by this disclosure, along with their insubstantial variations.

The invention claimed is:

1. A method performed by a movie player including a video disc reader, a media decoder for decoding audio-video data from the video disc reader, and a processor configured by program instructions, the method comprising:
commanding playback of video clips comprised of a sequence of video frames, as part of providing presentations of a video game, the playback of the video clips including decoding, by the media decoder, of video data for video frames, the video data stored on a local removable optical media, to provide decoded video signals, the media decoder decoding the video data in segments, in a list of segments, each segment having a beginning time and an ending time identified by time stamps, the media decoder decoding the video data in a sequence determined in accordance with the list of segments and based on input received from a controller during game play and a current game state;
generating, by the processor, and commanding display of game graphics, including prompts to a user to operate the controller, as part of providing presentations of the video game in conjunction with playback of the video clips; and
generating, by the processor, and commanding display of revised game graphics as part of providing presentations of the video game based on input received from the controller.

2. The method of claim 1, wherein the video data comprises video data for video frames, the video frames including portions devoid of video imagery.

3. The method of claim 2, wherein display location of the game graphics is located in display location of the video frame portions devoid of video imagery.

4. The method of claim 1, wherein the video data comprises video data for video frames, the video frames including portions providing foreground video imagery and background video imagery, and wherein display location of the game graphics is located in display location of the background video imagery.

5. The method of claim 1, wherein commanding display of revised game graphics is further based on timing of the playback of the video clip as indicated by timing information associated with the video data.

6. The method of claim 1, further comprising commanding playback of a further video clip comprised of a further sequence of video frames based on the input received from the controller during game play and the current game state.

7. The method of claim 1, further comprising:
commanding playback of an audio clip, the playback of the audio clip including decoding of audio data stored on the removable optical media memory to provide decoded audio signals; and
determining a volume of playback of at least part of the audio clip based on the input received from the controller.

8. The method of claim 7, further comprising commanding playback of another audio clip based on the input received from the controller.

9. The method of claim 7, wherein the audio clip comprises audio of a first audio channel and audio of a second audio channel, and wherein determining the volume of playback of at least part of the audio clip based on the input received from the controller comprises determining a volume of at least one of the audio of the first audio channel and the audio of the second audio channel based on the input received from the controller.

10. The method of claim 9, wherein the audio of the second audio channel includes audio associated with a game player and the volume of the second audio channel is lowered when the input received from the controller differs from an instructed input.

11. The method of claim 9, further comprising determining a left-right balance of at least one of the audio of the first audio channel and the audio of the second audio channel based on the input received from the controller.

12. The method of claim 7, further comprising commanding presentation of additional game sounds based on the input received from the controller.

13. The method of claim 1, further comprising, based on the input from the controller and a current game state, determining whether playback of the video clip should transition to a new frame in the sequence of video frames, and if playback of the video clip should transition to a new frame in the sequence of video frames, determining the new frame in the sequence of video frames and commanding playback of the video clip beginning at the new frame.

14. The method of claim 1, further comprising, based on the input from the controller and a current game state, determining whether playback of the video clip should transition to a further video clip comprised of a further sequence of video frames, and if playback of the video clip should transition to the further video clip, commanding playback of the further video clip.

15. The method of claim 1, wherein the media decoder decodes multiple segments in sequence according to the list of segments.

16. The method of claim 1, wherein the list of segments includes PlayItems.

17. The method of claim 16, wherein the PlayItems comprise a clip identifier, a beginning time, and an ending time.

18. The method of claim 17, wherein the video data is formatted as MPEG-2 data.

\* \* \* \* \*